United States Patent [19]
Munch

[11] 3,941,368
[45] Mar. 2, 1976

[54] FILM TRANSPORT MECHANISM

[75] Inventor: Joseph Munch, Deurne, Belgium

[73] Assignee: Compagnie Generale de Radiologie, Paris, France

[22] Filed: Oct. 7, 1974

[21] Appl. No.: 512,870

[30] Foreign Application Priority Data
Oct. 12, 1973 Belgium .................................. 53142

[52] U.S. Cl. ................. 271/5; 271/DIG. 9; 271/11; 271/94; 271/99; 271/272
[51] Int. Cl.² ....................... B65H 5/12; B65H 7/16
[58] Field of Search ............. 271/DIG. 2, DIG. 9, 4, 271/5, 11, 14, 94, 99, 104, 106, 108, 112, 114, 119, 174, 268, 272

[56] References Cited
UNITED STATES PATENTS

| | | | |
|---|---|---|---|
| 3,341,192 | 9/1967 | McMahon | 271/5 |
| 3,572,686 | 3/1971 | Day | 271/94 |
| 3,583,696 | 6/1971 | Runzi | 271/4 |

*Primary Examiner*—Evon C. Blunk
*Assistant Examiner*—Robert Saifer
*Attorney, Agent, or Firm*—Edwin E. Greigg

[57] ABSTRACT

A transport mechanism for sheets of X-ray film includes a pair of cooperating rollers, at least one of which is hollow, between which the top sheet of a stack of sheets in a loading cartridge is transported to a location within the associated X-ray machine, where it is exposed. The attachment of the sheet of film to the hollow roller is aided by reducing the air pressure therein, providing suction to the film through a slot or slots in the periphery of the hollow cylinder. The drive assembly for the rollers includes various switches and relays, actuated automatically by cams or manually, for controlling the transport of the film into the X-ray machine and for delivering the exposed film to a developing machine.

7 Claims, 1 Drawing Figure

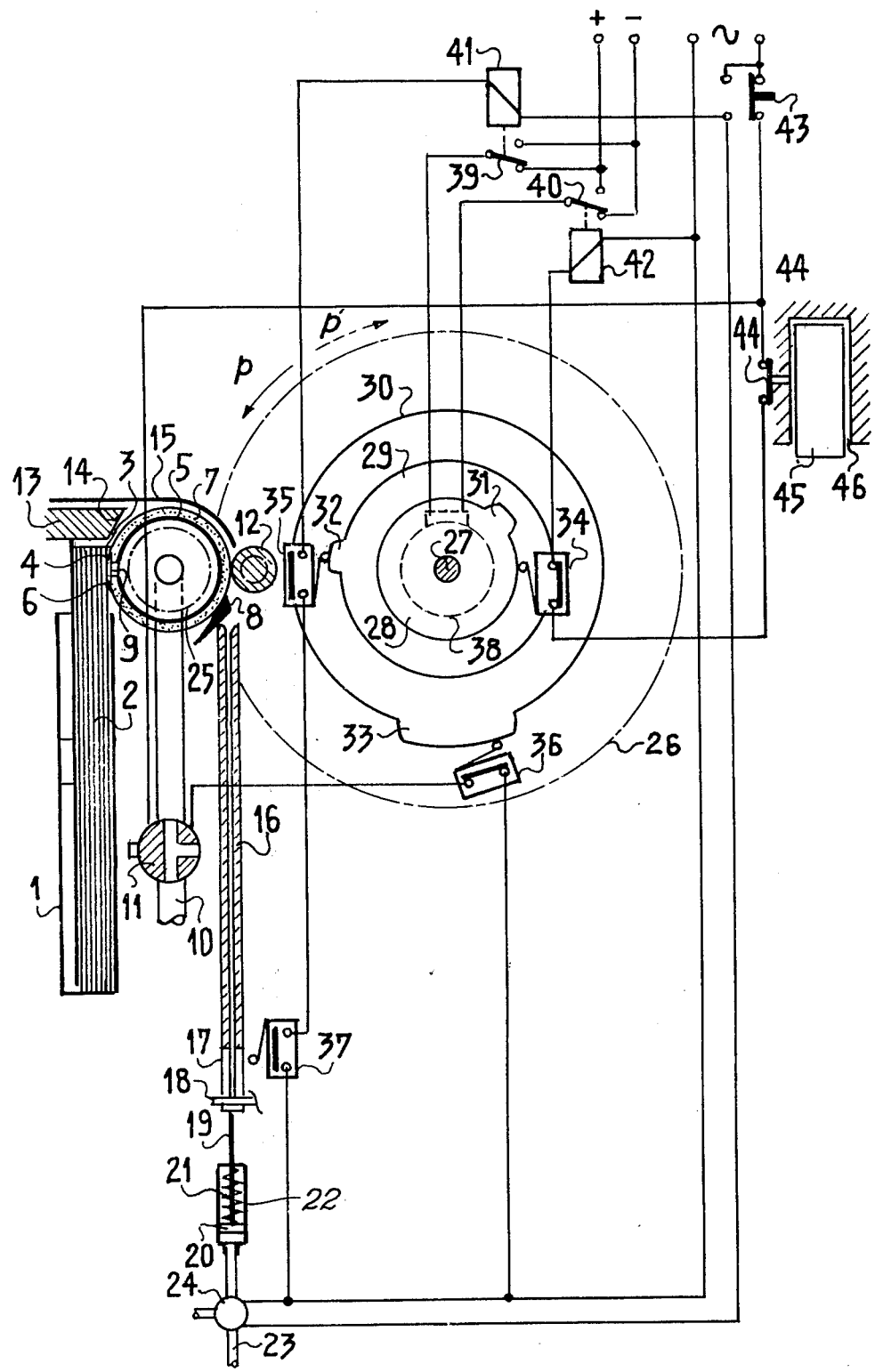

FILM TRANSPORT MECHANISM

BACKGROUND OF THE INVENTION

The invention relates to a mechanism for transporting film into the interior of an X-ray apparatus and an X-ray apparatus adapted to utilize this mechanism.

The film transport mechanism according to the invention withdraws a sheet of film from a package and guides it to an intensifier screen in the X-ray apparatus for making an X-ray exposure. Subsequently, it advances the exposed film toward a developing machine.

According to a principal characteristic of the invention, the mechanism essentially comprises:

a loading cartridge in which the film is packaged and wherein at least a part of the first sheet of film is accessible for grasping it;

a hollow control cylinder for grasping and transporting the film, provided with at least one longitudinal slot across the outer circumference of this control cylinder against which the film sheet to be extracted from the loading cassette may be pressed;

means connected to the shaft of this control cylinder for evacuation thereof;

a transport roller, cooperating with the control cylinder for the mechanical transport of the film once the suction device has been uncoupled;

drive elements for rotating the cylinder and the roller in opposite directions;

a stop, located near the top of the film cassette, a short distance from the cylinder, so that only one sheet film at a time may pass between the control cylinder and the stop, whereas the other film sheets are retained by the stop;

intensifier screens, placed below the cylinder and roller, with the transported sheet of film being placed between the screens for making and X-ray exposure;

means placed vertically below the screens for pushing the exposed film sheet back toward the cylinder and roller in order to transport it in the opposite direction, toward the developing machine.

BRIEF DESCRIPTION OF THE DRAWING

By way of a non-limiting example, a detailed description of an exemplary embodiment, simplified for clarity, of the mechanism according to the invention is given below, to be used with the accompanying drawing. The single FIGURE of the drawing is a schematic cross-section of the principal parts of the mechanism. In this FIGURE, the mechanism is shown at the start of its operational cycle.

DESCRIPTION OF THE PREFERRED EMBODIMENTS

The mechanism depicted in the FIGURE includes an open box 1 containing film sheets 2 which is placed in an X-ray machine.

The open box 1 is disclosed in greater detail in my co-pending application filed Sept. 16, 1974, entitled "X-ray Film Container."

The upper edge of the first film sheet 3 lies against a plane surface 4 provided on the circumference of a hollow control cylinder 5. The lower edge 6 of the surface 4 presses against the film sheets 2 during the rotation of the control cylinder and pushes them away from the cylinder. Only the film sheet 3, nearest to the control cylinder, is bent a little bit by suction in order to be easily transported by the cylinder.

The control cylinder is equipped with elastic bands, for example rubber bands 7, which are relatively large and closely spaced. Protrusions or teeth 8 are fixed to the frame between the rubber bands and serve to detach the film sheet 3 from the control cylinder. Located on the face 4 are several longitudinal slots 9 disposed one behind the other so as to completely transverse the wall of the control cylinder 5 and the rubber bands 7. The interior of the control cylinder is connected to a suction source which includes a line 10 and a three-way electromagnetic valve 11. This valve may place the control cylinder in communication with the suction source or with ambient air. A transport roller 12, made of rubber, presses against the control cylinder and is rotated thereby. A film sheet may be mechanically transported between the cylinder and the roller. A fixed stop 13, with a tapering edge 14, is located so that only one single film sheet may pass between the edge and the surface of the cylinder. A fixed guide plate 15 is intended to guide an exposed film sheet beyond the stop 13 toward a developing machine (not shown). A short distance below the two cylinders 5, 12 lie the intensifier screens 16 of the X-ray machine between which the film sheet 3 is placed for making an X-ray exposure. The lower edges of these screens have a vertical slot 17 in which a stop 18 may be caused to reciprocate to push out a film sheet lying between these screens after the exposure has been made so that it may glide between the rollers 5 and 12, for transport toward a developing machine, as will be described below. The stop 18 is affixed to a rod 19 of a piston 20, which is moved downwardly by a spring 21 located in a pneumatic cylinder 22. This cylinder is connected by line 23 to a source of compressed air (not shown). The cylinder may be placed in communication with the source of compressed air or with exterior atmospheric air by means of a three-way valve 24. The shaft of cylinder 5 carries a pinion 25 meshing with a gear wheel 26 whose diameter is such that the pinion 25 and the control cylinder 5 complete four revolutions while the gear 26 completes one revolution. The shaft 27 of the gear 26 carries three cam plates 28, 29, 30, equipped, respectively, with cams 31, 32 and 33. Each cam plate cooperates respectively with a contact 34, 35, 36 and a stop 18 cooperates with a contact 37. Shaft 27 is driven by an electric motor 38 in either of two directions of rotation through a speed reducer. The electrical circuit of this motor is controlled by two contacts 39 and 40 and a relay 41, as well as a relay 42. The circuit for relay 41 is controlled by the contacts 37, 35 and 43 and that of relay 42 by contacts 34, 44 and 43. The circuit for the three-way valve 11 is controlled by the contacts 36 and 43 and that of the valve 24, by the contact 43. The contact 43 is operated manually by a push button, whereas the contact 44 is actuated by a card 45, pushed into a slot 46 of the X-ray machine and carrying the information concerning the patient to be examined.

To make an X-ray exposure, one proceeds as follows. The card 45, containing the information on the patient, is inserted into the slot 46 of the X-ray machine and closes the contact 44, energizing the relay 42. The contact 40 of that relay closes the circuit for the motor 38, which begins to turn in the sense of the arrow P. Cam 33 of the disc 30, mounted on shaft 27 of the motor, closes contact 36, so that the electromagnetic valve 11 is energized and the air supply line 10 is opened. Thus, air is aspirated out of the control cylinder 5 by the suction source (not shown). The film sheet 3 is therefore attracted to the slot 9 in the control cylinder. The gears 25, 26 rotate the control cylinder 5 so that the edge of the plane surface 4 pushes the film sheets 2 below the stop 13, whereas only the film sheet 3, which is attracted by suction, flexes slightly toward the cylinder. This facilitates the transport of film sheet 3 by the control cylinder along the inclined edge 14 of stop 23, whereas the other film sheets are retained by the stop. After the control cylinder 5 has made half a revolution, the cam 33 passes the contact 36 and opens it. Thus, the control circuit of the electromagnetic valve is interrupted, the valve closes and atmospheric pressure returns into the control cylinder and the film sheet is no longer aspirated. In the meantime, however, the edge of the transported film sheet is grasped between the control cylinder 5 and the transport roller 12 and it is transported mechanically due to the continued rotation of the control cylinder. When the film emerges from the two cylinders, it is lifted from the control cylinder 5 by the teeth 8 fixed to the housing and is carried further toward the intensifier screens 16. After the control cylinder 5 has made four revolutions, the cam plates 28, 29, 30 have made only one revolution and the cam 31 has opened contact 34. Therefore, the relay 42 is released and its contact 40 switches over. In the meantime the contact 35 is closed but, since contact 37 remains open, this has no effect. Due to the switchover of contact 40, the circuit to electric motor 38 is interrupted and the motor stops. When an X-ray exposure has been made on the film located between the reinforcing frames 16, the card 45 is withdrawn from the slot 46.

To initiate the development of a film exposed between the frame 16, one pushes on the contact 43 so that the circuit for the valve 24 is closed and the valve connects the cylinder 22 with a source of compressed air (not shown). Thus, the piston 20 moves the stop 18 upwardly and the film is again engaged between the cylinders 5 and 12.

At the end of the movement of this stop 18 in the upward direction, it closes the contact 37 and, since contact 35 is still closed, the relay 41 is energized. The contact 39 switches over and the electric motor 38 begins to turn in the opposite direction, indicated by the arrow P'. Thus the gears 25 and 26 drive the control cylinder 5 and the transport roller 20 in the opposite sense of that which directed the film toward the intensifier screens. Cam 31 on plate 28 releases contact 34 so that it closes, but since the contacts 44, 43 are both open, this has no effect. Cam 33 closes the contact 36 but, since the contact 43 remains open, this also remains without further effect. After one revolution of the gear 26 and of the cam plate 29 and after four revolutions of the control cylinder 5, the cam 32 opens the contact 35, causing the release of relay 41. This release causes contacts 39 of the relay to switch, so that the motor 38 stops. In the meantime, the film has been completely withdrawn from the screens 16 and has been transported horizontally beyond the stop 13.

Due to the presence of the guide plate 15, the film follows the desired path exactly. Subsequently, it is engaged by another mechanism (not shown), which transports it to a developing machine. When the contact 43 is returned to its original position, the air supply to the valve 24 is interrupted so that the valve opens the cylinder 22 to the atmosphere and the compressed air flows out of the cylinder. Thus, spring 21 is able to push the piston and its cam 18 downwardly and contact 37 opens. Thus, the mechanism is ready, as described above, to transfer a new film sheet from the container 1 toward the screens 16.

It is to be understood that the form, the dimensions, and the relative disposition of the parts, described above, could be changed and that certain of these parts could be replaced by others performing the same function, all the while remaining within the scope of the invention.

What is claimed is:

1. An X-ray film transport apparatus, comprising in combination:
   a. a housing;
   b. a hollow cylinder, arranged to rotate within said housing and equipped with means for the evacuation of air therefrom;
   c. a transport roller arranged to rotate within said housing, in cooperation with said hollow cylinder;
   d. a film loading cartridge containing sheets of film, placed within the housing, adjacent to said hollow cylinder;
   e. drive means for rotating said hollow cylinder to advance the film sheet for exposure;
   f. means for initiating the return motion of the sheets of film from the apparatus after exposure thereof; and
   g. means for controlling the feed of the sheets of film in said film loading cartridge seriatim for exposure whereby the top sheet of film in said film loading cartridge is aspirated to the surface of said hollow cylinder after evacuation of some air therefrom, and is transported between said hollow cylinder and said transport roller to be exposed, whereupon said means for initiating the return motion of the film are engaged and the motions of said hollow cylinder and said transport roller are reversed for transporting the film out of the apparatus.

2. An apparatus as defined in claim 1, wherein said hollow cylinder has an axially extending plane surface, which merges with the curved cylindrical surface and, located therein and extending axially, is at least one slot, against which a sheet of film may be aspirated, due to evacuation of some air from the interior of said hollow cylinder; whereby, during rotation of said hollow cylinder, the one boundary edge formed between said axially extending plane surface and said curved cylindrical surface of said hollow cylinder tends to displace the stack of film away from the surface of said hollow cylinder.

3. A film transport apparatus as defined in claim 1, further comprising at least one protrusion affixed to said housing, which engages a sheet of film entrained on said hollow cylinder to aid in the removal of said sheet of film from said hollow cylinder and wherein said hollow cylinder is provided with bands of elastic material, said protrusion passing between adjacent ones of said bands and wherein said transport roller is covered with elastic material.

4. A film transport apparatus as defined in claim 1, wherein said means for controlling the feed of the film has an edge which is inclined in the direction of said hollow cylinder and is so disposed in relation thereto that only one sheet of film may pass between said edge and the surface of said hollow cylinder.

5. A film transport apparatus as defined in claim 1, further comprising a plate for guiding a sheet of film out of said apparatus after exposure.

6. A film transport apparatus as defined in claim 1, wherein said drive means includes an electric motor, a first gear affixed to said hollow cylinder and a larger, second gear, meshing with said first gear and affixed to the shaft of said motor, the ratio between said gears being one to four (1:4).

7. A film transport apparatus as defined in claim 1, wherein said means for initiating the return motion of the film after exposure includes a pneumatic cylinder with a piston on whose rod is affixed a cam on which the edge of a sheet of film rests when properly located for an X-ray exposure.

* * * * *